United States Patent [19]
Infante

[11] Patent Number: 5,428,270
[45] Date of Patent: Jun. 27, 1995

[54] DYNAMIC FOCUS CORRECTION CIRCUIT

[75] Inventor: Carlo Infante, Scottsdale, Ariz.

[73] Assignee: Digital Equipment Corporation, Maynard, Mass.

[21] Appl. No.: 107,496

[22] Filed: Aug. 17, 1993

[51] Int. Cl.⁶ .............................................. G09G 1/04
[52] U.S. Cl. .................................................. 315/382
[58] Field of Search ...................... 315/382, 382.1, 371

[56] References Cited

U.S. PATENT DOCUMENTS

| | | | |
|---|---|---|---|
| 3,422,305 | 1/1969 | Infante | 315/24 |
| 3,501,669 | 3/1970 | Henderson | 315/18 |
| 3,806,758 | 4/1974 | Lundqvist | 315/31 R |
| 3,961,223 | 6/1976 | Ray et al. | 315/371 |
| 4,258,298 | 3/1981 | Hilburn et al. | 315/382 |
| 4,499,457 | 2/1985 | Hintze | 340/703 |
| 4,518,898 | 5/1985 | Tarnowski et al. | 315/371 |
| 4,633,144 | 12/1986 | McKibben | 315/382 |
| 5,039,923 | 8/1991 | Ogino et al. | 315/382 |
| 5,091,681 | 2/1992 | Sutton | 315/382 |

Primary Examiner—Gregory C. Issing
Attorney, Agent, or Firm—Mary M. Steubing

[57] ABSTRACT

A method and apparatus for generating a dynamic focus signal for focusing an electron beam on a CRT, the signal being proportional to a function of the vertical deflection Y and horizontal deflection X of the beam according to $X^2+Y^2+X^2f(Y)$ or $X^2+Y^2+Y^2f(X)$, where $f(Y)$ or $f(X)$ is a positive symmetric function. The resultant dynamic focus signal has increased magnitude as the beam moves away from the center of the screen, thus providing proper focusing at the corners of the screen as well as at the center and sides of the screen.

6 Claims, 11 Drawing Sheets

SCREEN POSITION

DYNAMIC FOCUS CORRECTION CIRCUIT

BACKGROUND OF THE INVENTION

The invention relates in general to cathode ray tube circuits, and in particular to dynamic focus signals used for focusing an electron beam on a CRT.

Cathode ray tubes (CRT) provide images on a screen by deflecting and focusing an electron beam through the use of electric and magnetic fields. When the beam leaves the cathode of a CRT, it is comparatively broad. An electrostatic focusing lens situated between the cathode and the CRT screen is adjusted such that its focus point occurs at the screen, causing the beam to converge to a narrow spot as it reaches the screen. The lens adjustment thus depends on the distance the beam must travel to the screen and on the deflection bringing field. In most CRT's, and especially in large, relatively flat screen CRT's, the distance the beam must travel varies with the distance of deflection of the beam from screen center. Thus if a focusing lens is adjusted to provide good focus at screen center, the beam will be defocused when deflected from center.

To solve this problem, focusing lenses, driven by a focusing signal from a dynamic focus signal generator, are designed to dynamically change focal length. The dynamic focus signal generator typically generates a signal from signals proportional to beam deflection. In particular, one focusing signal typically used is proportional to the sum of the squares of the horizontal and vertical components of the beam deflection. That is, if the beam is deflected by X in the horizontal direction and Y in the vertical direction, the dynamic focus signal is proportional to $X^2 + Y^2$.

However, it has been found that the effective focal length deviates from the sum of the squares of the distance from screen center in such a way that the $X^2 + Y^2$ signal is insufficient for proper focusing of the beam at the corners of the screen as well as at the sides and the center of the screen. Interactive compromising schemes are then required whereby the corner focusing and center focusing are manually adjusted until an acceptable compromise is found for the center, corner, and side focusing.

SUMMARY OF THE INVENTION

What is needed then is a dynamic focus signal generator which generates a more precise focusing signal from signals proportional to beam deflection such that the beam is properly focused at the center, the sides, and the corners of the screen.

According to one aspect of the present invention, a dynamic focus signal is provided for focusing an electron beam on a CRT, the signal being such that the difference in magnitude of the signal applied to focus the beam as it moves from the center of a side of the screen to a corner region formed at the side and an adjacent side of the screen is greater than the difference in magnitude of the signal applied to focus the beam as the beam moves from the center of the screen to the center of the adjacent side of the screen.

According to a further aspect of the invention, there is provided a dynamic focus signal generator for focusing an electron beam on a CRT screen, the dynamic focus signal generator comprising an input for receiving information related to the position of the beam on the CRT screen, and circuitry responsive to the input information to provide an output signal for focusing the beam during operation where the difference in magnitude of the output signal applied to focus the beam at the center of a side of the CRT screen and the magnitude of the output signal applied to focus the beam at a corner region formed by such side and an adjacent side of the CRT screen is greater than the difference in magnitude of the output signal applied to focus the beam at the center of the CRT screen and the magnitude of the output signal applied to focus the beam at the center of the adjacent side of the CRT screen. More specifically, the information related to the position of the beam on the CRT screen may include horizontal and vertical deflection signals, or may include the squares of the horizontal and vertical deflection signals.

According to a further aspect of the invention, a dynamic focusing signal generator is provided for a CRT having a deflection signal including a horizontal and a vertical component, the dynamic focusing signal generator comprising means for providing a signal proportional to the square of the horizontal component of the deflection signal as a squared horizontal position signal $X^2$; means for providing a signal proportional to the square of the vertical component of the deflection signal as a squared vertical position signal $Y^2$; means for providing a positive symmetric function $f(Y)$ of the vertical component of the deflection signal; means for providing a signal proportional to the product of the positive symmetric function $f(Y)$ and the squared horizontal position signal $X^2$; and means for providing a signal proportional to the sum of the product, the squared horizontal position signal $X^2$, and the squared vertical position signal $Y^2$.

With such an arrangement, a dynamic focus signal provides proper focusing of the beam at the center, the sides, and the corners of the screen, thus eliminating the need for interactive compromising schemes.

DETAILED DESCRIPTION OF THE PREFERRED EMBODIMENT

Figure 1:
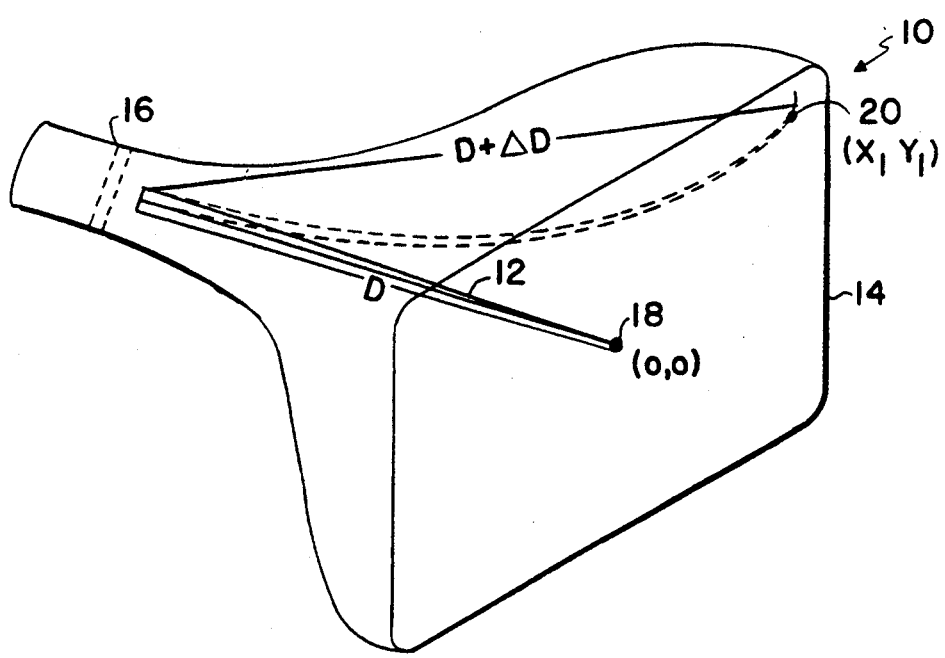
FIG. 1 is a representation of a cathode ray tube (CRT) showing electron beam deflection.

Referring to FIG. 1, there is shown a cathode ray tube (CRT) 10 on which an image is generated by deflecting an electron beam 12 across a screen 14. The beam 12 is focused on the screen 14 by an electrostatic lens 16. In order to generate a sharp image, precise focusing of the beam 12 must be maintained over the entire screen 14, including the center 18 of the screen 14, as designated by position (0,0), as well as the corners, 20 for example, of the screen 14, as designated by position $(x_1, y_1)$. However, deflection of the beam from position (0,0) to position $(x_1, y_1)$ necessarily increases the distance the beam must travel. Here, the beam travels a distance D to position (0,0), but must travel a distance $D + \Delta D$ to position $(x_1, y_1)$. The focal length of the electrostatic lens 16 must therefore be adjusted relative to the deflection of the beam.

Figure 2:
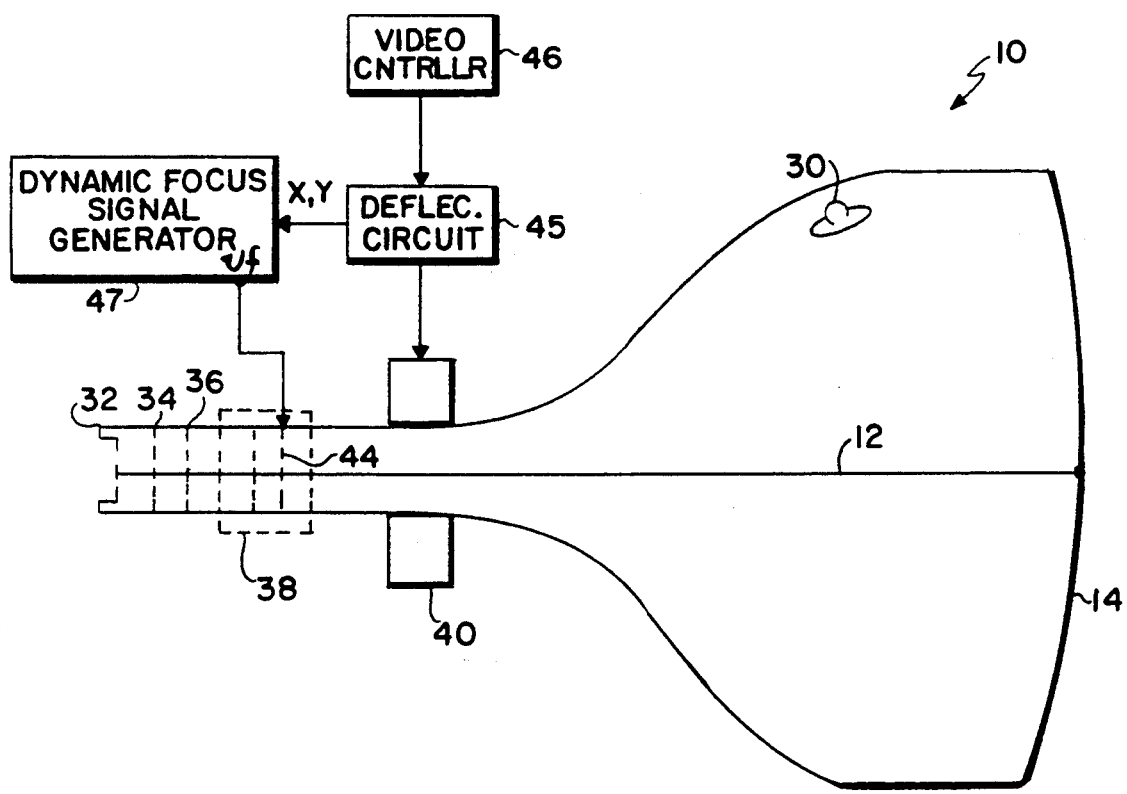
FIG. 2 is a more detailed representation of the various elements of the CRT of FIG. 1.

Referring now to FIG. 2, there is shown the CRT 10 in further detail. The CRT 10 may be of a variety of conventional types, and here includes a high voltage anode 30, a cathode 32 and cooperating grids 34 and 36, an electrostatic lens 38, a yoke 40 and the screen 14. The lens 38 includes a focus grid 44 fed by a dynamic focus signal $V_f(t)$.

The cathode 32 as controlled by the grids 34 and 36 generates the electron beam 12. The beam 12 is deflected by deflection circuitry 45. The beam 12 may be deflected in a number of ways, for example by an electrostatic deflection method commonly used in oscilloscopes and stroke writers, or as shown here by magnetic deflection, commonly used in raster scan systems. Here, the beam 12 is deflected by magnetic fields produced by the yoke 40 in response to a horizontal deflection signal X and a vertical deflection signal Y generated within the deflection circuitry 45 in response to synchronization signals from the video controller 46. A dynamic focus signal generator 47 responds to information from the deflection circuitry 45 related to the position on the screen to generate the dynamic focus signal $V_f(t)$ which adjusts the voltage applied to the focus grid 44, effectively changing the focal length of the electrostatic lens 38.

Figure 3A:
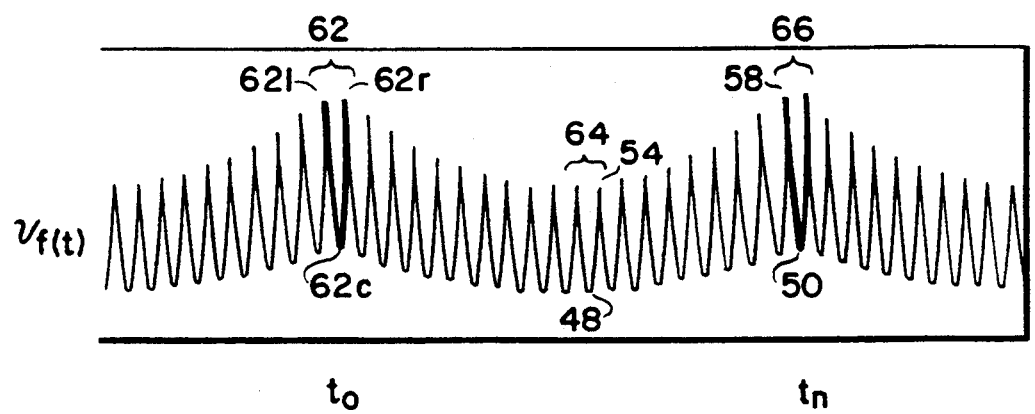
FIG. 3(a) is a plot of the dynamic focus signal as a function of time.
Figure 3B:
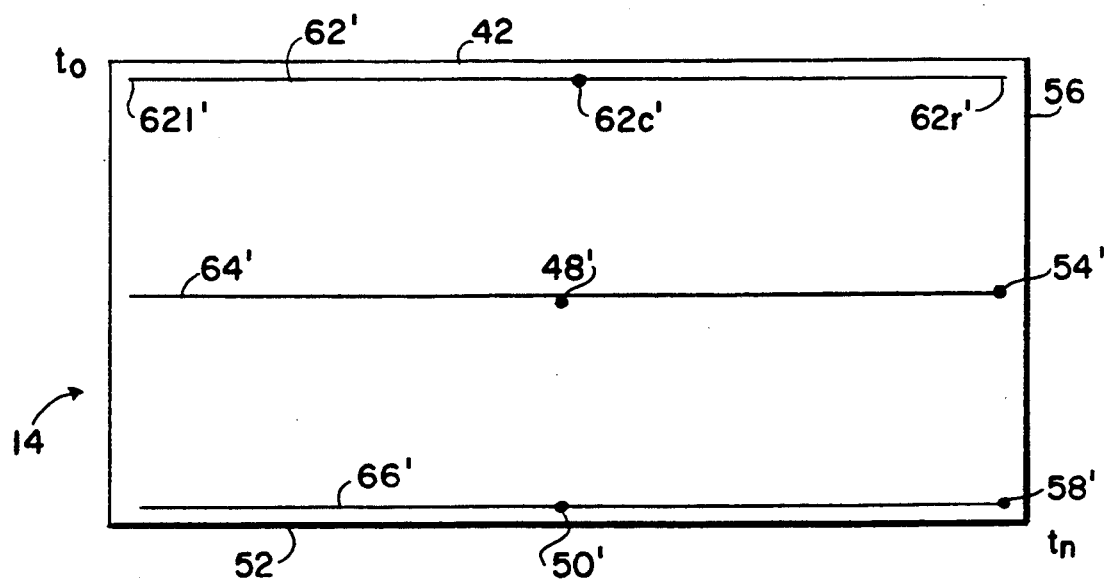
FIG. 3(b) is a representation of the CRT screen showing various positions on the screen as they relate to the dynamic focus signal of FIG. 3(a)

Referring now to FIG. 3, there is shown in FIG. 3(a) a dynamic focus signal $V_f(t)$ which drives the focus grid 44 (FIG. 2) to adjust the focal point of the electrostatic lens 38 in a way which provides precise focusing of the beam over the entire screen. For purposes of clarity, the signal shown operates on a raster scan CRT of only 20 lines, rather than the more typical 400+ lines. Referring also to FIG. 3(b) which identifies various positions on the screen 14 as they relate to the focus signal $V_f(t)$, the region labeled 48 on the signal $V_f(t)$ corresponds to a beam position 48' of the center of the screen 14. The region labeled 50 corresponds a beam position 50' at a center of a side 52 of the screen. The region of the signal $V_f(t)$ labeled 54 corresponds to the center 54' of an adjacent side 56 of the screen. The region of the signal $V_f(t)$ labeled 58 corresponds to a position 58' formed at a corner formed by the side 52 and the adjacent side 56.

Significantly, the difference in magnitude of the signal applied to focus the beam as it moves from the center of a side of the screen 50' to a corner region 58' of the screen 14 is greater than the difference in magnitude of the signal applied to focus the beam as the beam moves from the center 48' of the screen 14 to the center of the adjacent side 54' of the screen 14.

Thus, for the raster scan system shown where the beam 12 starts in the upper left corner and sweeps across horizontal scan lines from left to right until it reaches the bottom of the screen 14, the change in magnitude of the signal $V_f(t)$ applied for each scan line continually decreases as the beam approaches the center scan line on the screen 14, and then continually increases as the beam approaches the bottom of the screen 14.

For example, as shown in FIG. 3(b), the beam 12 begins a vertical trace at position 62I'. The dynamic focus signal $V_f(t)$ has a relatively large change in magnitude at the region 62 of FIG. 3(a), which corresponds to a beam sweep across the top scan line 62' of FIG. 3(b). The upper peaks of the region 62 marked 62l and 62r correspond to the left and right sides of the scan line 62', marked 62l' and 62r'. while the trough of the region 62 marked 62c corresponds to the center of the scan line 62', marked 62c'. The change in magnitude of the dynamic focus signal $V_f(t)$ for each scan line decreases as the beam approaches the center scan line 64' on the screen, until the change in magnitude is minimal for the scan line 64' as shown by region 64 of FIG. 3(a). The change in magnitude of the dynamic focus signal $V_f(t)$ for each scan line then continually increases as the beam 12 approaches the bottom scan line 66' until it again reaches a maximum relative change in magnitude as shown by region 66 in FIG. 3(a).

The principles of the dynamic focus signal $V_f(t)$ also operate advantageously in a stroke writing system. In a stroke writing system, the magnitude of the focus signal $V_f(t)$ when the beam is writing in a corner region of the screen will be greater than the sum of the magnitudes of the focus signals used to focus the beam at the centers of the sides of the screen. Thus, if the screen shown in FIG. 3(b) operates in a stroke writing system, the magnitude of the focus signal $V_f(t)$ applied to focus the beam at position 58' is greater than the sum of the magnitudes of the focus signal $V_f(t)$ needed to focus the beam at positions 50' and 54'.

Accordingly, a dynamic focus signal generator is provided which accepts as input information related to the position of the beam 12 on the CRT screen 14, and provides as output a dynamic focus signal $V_f(t)$ substantially of the profile shown in FIG. 3(a), where the difference in magnitude of the signal applied to focus the beam as it moves from the center of a side of the CRT screen 14 to a corner region of the CRT screen 14 is greater than the difference in magnitude of the signal applied to focus the beam as the beam moves from the center of the CRT screen 14 to the center of the adjacent side of the CRT screen 14.

Where the information related to the position of the beam 12 on the CRT screen 14 includes the horizontal deflection X and the vertical deflection Y of the beam 12, a signal with the properties of the signal $V_f(t)$ shown in FIG. 3(a) is provided as a function of the horizontal deflection X and vertical deflection Y as follows:

$$K_1X^2+K_2Y^2+K_3X^2F(Y) \quad \text{Equation 1.}$$

where F(Y) is a positive symmetrical function of Y. This function is interchangeable with the function:

$$K_1X^2+K_2Y^2+K_3Y^2f(X) \quad \text{Equation 2.}$$

where f(X) is a positive symmetrical function of X. The constants $K_1$, $K_2$, and $K_3$ denote constants of proportionality which may be present for each term. The function of Equation 1 will be used in the following examples for convenience.

Referring now to FIG. 4, there are shown graphs representing the generation of a focus signal $V_f(t)$ of the form of Equation 1 for a 20 line raster scan system, and particularly of the form:

$$K_1X^2+K_2Y^2+K_3X^2Y^2 \quad \text{Equation 3.}$$

where $f(Y)=Y^2$. Use of this particular function provides ease of implementation because it relies on only two functions of X and Y which are typically already available in the traditional focus generation circuitry. In a raster scan system, the beam 12 sweeps from the upper left corner on the screen 14 across successive scan lines towards the bottom of the screen. The position of the beam thus depends on time.

Figure 4A:
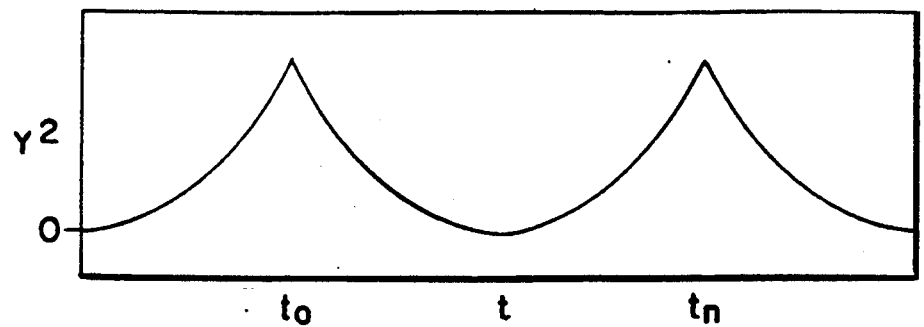
FIG. 4(a) is a plot of vertical deflection squared ($Y^2$) as a function of time.
Figure 4B:
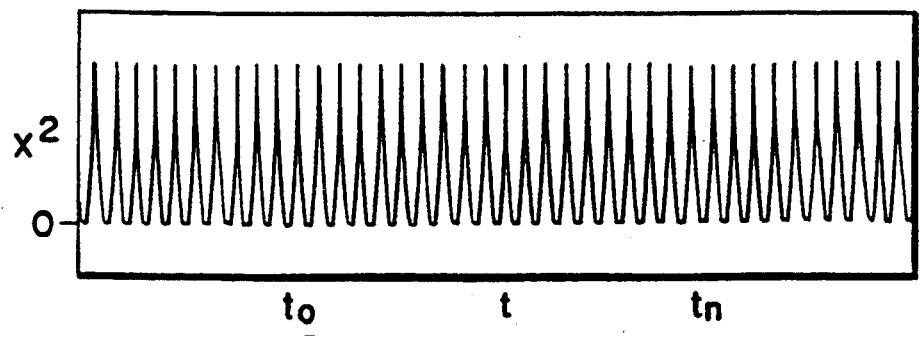
FIG. 4(b) is a plot of horizontal deflection squared ($X^2$) as a function of time.
Figure 4C:
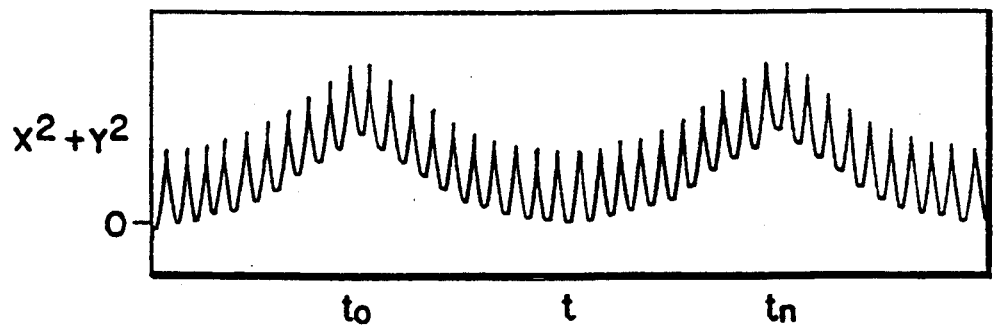
FIG. 4(c) is a plot of $X^2 + Y^2$ as a function of time.
Figure 4D:
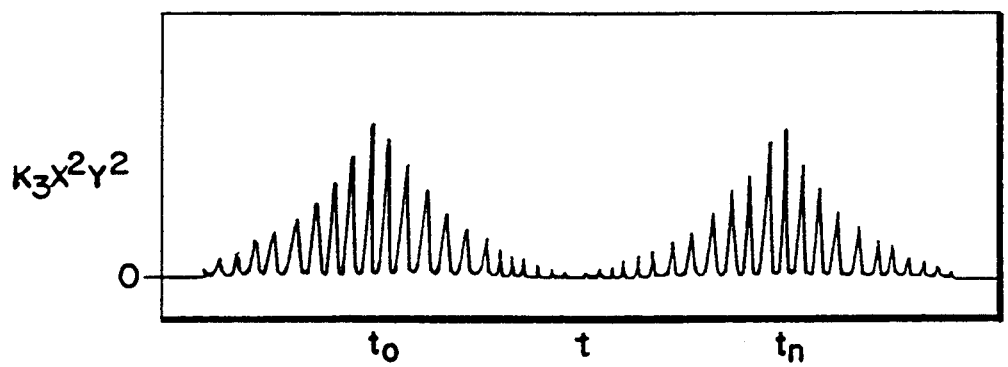
FIG. 4(d) is a plot of a signal proportional to $K_3 X^2 Y^2$ as a function of time.
Figure 4E:
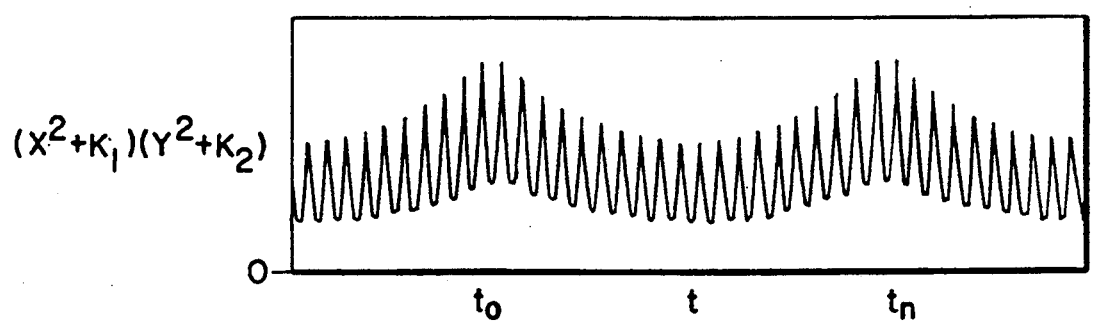
FIG. 4(e) is a plot of the dynamic focus signal proportional to $(X^2 + K_1)(Y^2 + K_2)$ as a function of time.

In FIG. 4(a) there is shown the parabolic function $K_2Y^2$ as a function of time, resulting from the squaring of the ramp deflection signal Y. The peaks of the function $K_2Y^2$ occur when the beam is positioned at the top or bottom of the screen. In FIG. 4(b) there is shown the parabolic function $K_1X^2$ resulting from the squaring of the ramp deflection voltage X for the 20 line screen 42, the peaks of the function being discernable due to the small number of scan lines of the example. The peaks of the $K_1X^2$ function occur at the beginning and end of each horizontal scan line. In FIG. 4(c) there is shown the addition of the functions of FIGS. 4(a) and 4(b) to obtain the function $K_1X^2+K_2Y^2$. In FIG. 4(d) there is shown the multiplication of the function $K_1X^2$ by the function $K_2Y^2$, providing the function $K_3X^2Y^2$. In FIG. 4(e) there is shown the addition of the two prior functions to obtain the dynamic focus signal $V_f(t)$ proportional to $K_1X^2+K_2Y^2+K_3X^2Y^2$, which has the properties of the signal shown in FIG. 3(a).

Figure 5:
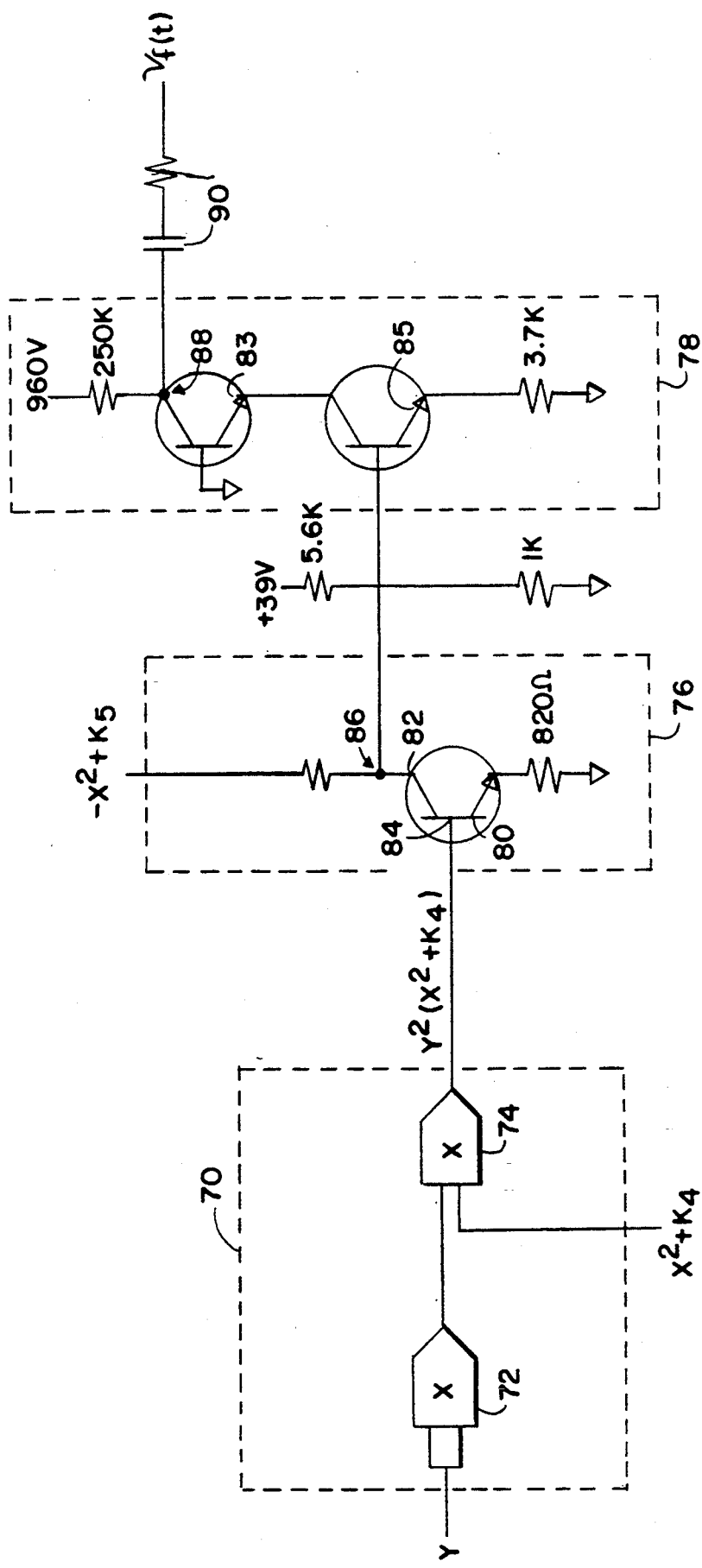
FIG. 5 is a schematic diagram of a preferred embodiment of the dynamic focus signal generator.

Referring now to FIG. 5, there is shown a preferred one of many possible embodiments of the dynamic focus signal generator 47 for producing a dynamic focus signal $V_f(t)$ of the form $K_1X^2+K_2Y^2+K_3X^2Y^2$. The dynamic focus generator includes a signal generator 70, implemented as a Philips TDA4850 integrated signal generator chip, which further includes a multiplier 72 and a multiplier 74. The output of the signal generator 70 is coupled to an adder 76, which is further coupled to an output cascode amplifier 78 for providing the dynamic focus signal $V_f(t)$.

The signal generator 70 accepts as input the ramp deflection voltage signal Y and the DC offset parabola signal $(X^2+K_4)$ derived from the ramp deflection voltage signal X; both signals being readily available from the standard deflection circuitry 45 (FIG. 2). The multiplier 72 squares the ramp deflection voltage signal Y to provide as output the parabola signal $Y^2$, which is fed to the multiplier 74. The multiplier 74 multiples the parabola signal $Y^2$ with the signal $(X^2+K_4)$ to provide as output a signal proportional to $Y^2(X^2+K_4)$, which is fed as input to the adder 76. The adder 76 also accepts as input another DC offset parabola signal $(-X^2+K_5)$.

The adder 76 here includes a transistor 80. The input signal $(-X^2+K_5)$ is coupled to the collector 82 of the transistor 80, while the output of the signal generator 70 drives the base 84 of the transistor 80 such that the voltage at node 86 is proportional to the sum of the signal driving the collector and the inversion of the signal driving the base of the transistor 80; that is, the voltage signal at node 86 is proportional to $-(X^2-K_5+Y^2(X^2+K_4))$. The signal at node 86 drives the output cascode amplifier 78, which further includes transistors 83 and 85 for re-inverting and amplifying the signal. The voltage at node 88 is then proportional to the signal $X^2-K_5+Y^2(X^2+K_4)$. The capacitor 90 removes extraneous DC offsets from the output signal, thus providing $V_f(t)$ proportional to $X^2+Y^2(X^2+K_4)$, or $X^2+K_4Y^2+X^2Y^2$, a signal of the form of Equations 1 and 3.

Figure 6:
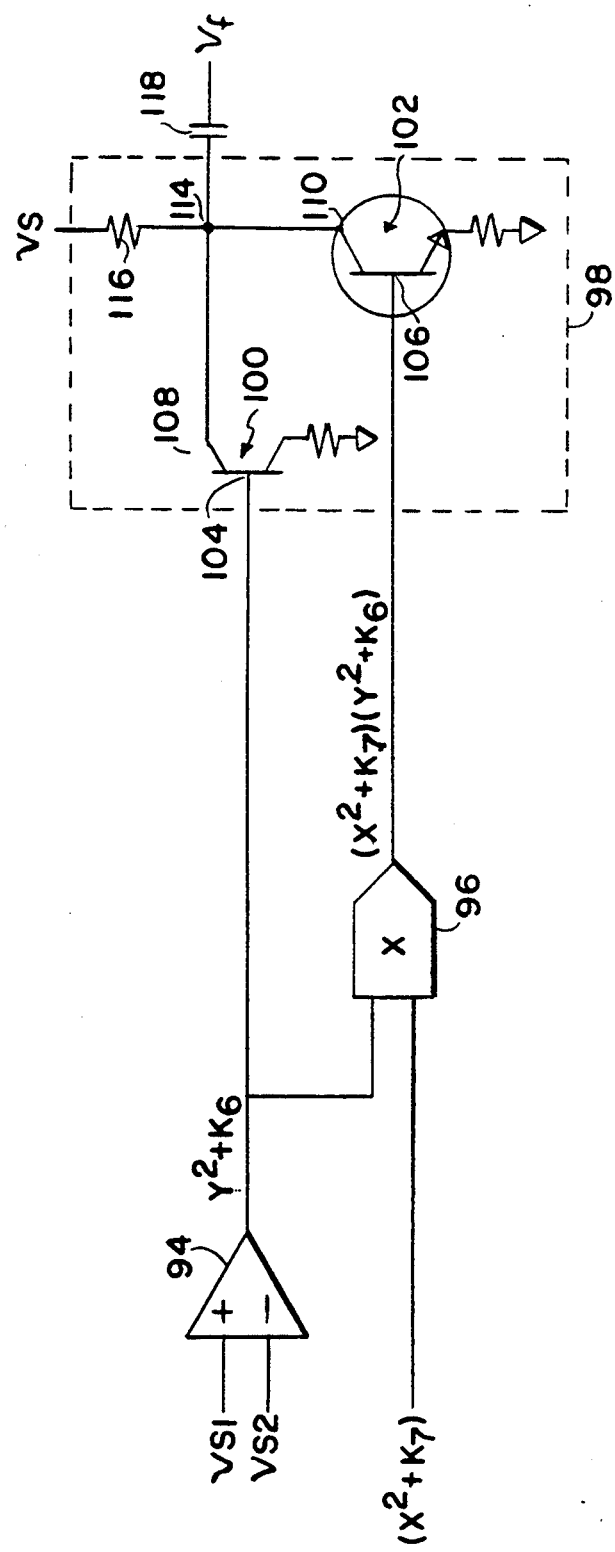
FIG. 6 is a schematic diagram of another embodiment of the dynamic focus signal generator.

Referring now to FIG. 6, there is shown another of the various embodiments of the dynamic focus signal generator 47. Here the dynamic focus signal generator 47 includes a differential amplifier 94, multiplier 96, and an adder 98.

The differential amplifier 94 accepts as input the signal Vs1, proportional to $(Y-Y^2)$, and the signal Vs2, proportional to Y. These two signals are generally readily available from the CRT deflection ciruitry 45. The differential amplifier 94 takes the difference of the Vs1 and Vs2 signals to provide a voltage signal proportional to $(Y^2+K_6)$. The signal $(Y^2+K_6)$ is fed to the multiplier 96 and the adder 98.

The multiplier 96 is a standard integrated circuit multiplier such as a Gilbert Cell. The multiplier 96 accepts as input the signal $(Y^2+K_6)$ from the differential amplifier 94 and the input signal $(X^2+K_7)$, which is available from the deflection circuitry. The multiplier 96 provides as an output a voltage signal proportional to $(Y^2+K_6)(X^2+K_7)$, which is fed to the adder 98.

The adder 98 includes transistors 100 and 102. The signal $(Y^2+K_6)$ drives the base 104 of the transistor 100, while the output of the multiplier 96 drives the base 106 of the transistor 102. The collector 108 of the transistor 100 is connected to the collector 110 of the transistor 102 at node 114. Node 114 is coupled through a resistor 116 to a supply voltage $V_s$ such that the current through the resistor 116 is proportional to the sum of the collector currents $I_{c108}$ and $I_{c110}$. The voltage signal thus provided across the resistor 116 is proportional to the sum of the signals $(Y^2+K_6)$ and $(X^2+K_7)(Y^2+K_6)$, thereby providing a signal proportional to $(1+K_7)Y^2+K_6X^2+X^2Y^2+K_6K_7+K_6$. The signal at node 114 is coupled to a capacitor 118 to remove extraneous DC offsets, thus providing the signal $V_f(t)$ proportional to $(1+K_7)Y^2+K_6X^2+X^2Y^2$, which is of the form of Equations 1 and 3.

Figure 7A:
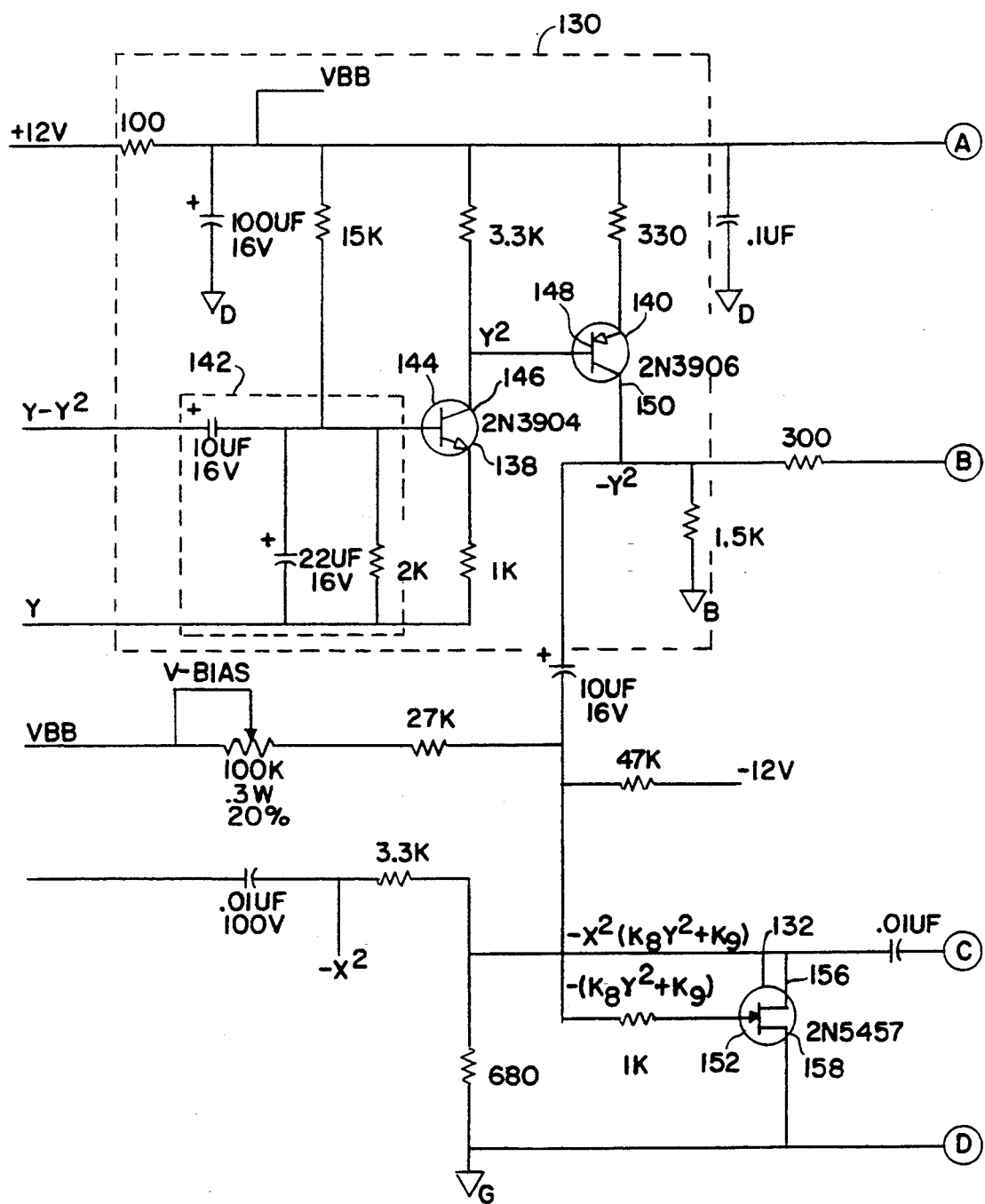
FIGS. 7(a) and 7(b) present a schematic diagram of another embodiment of the dynamic focus signal generator.
Figure 7B:
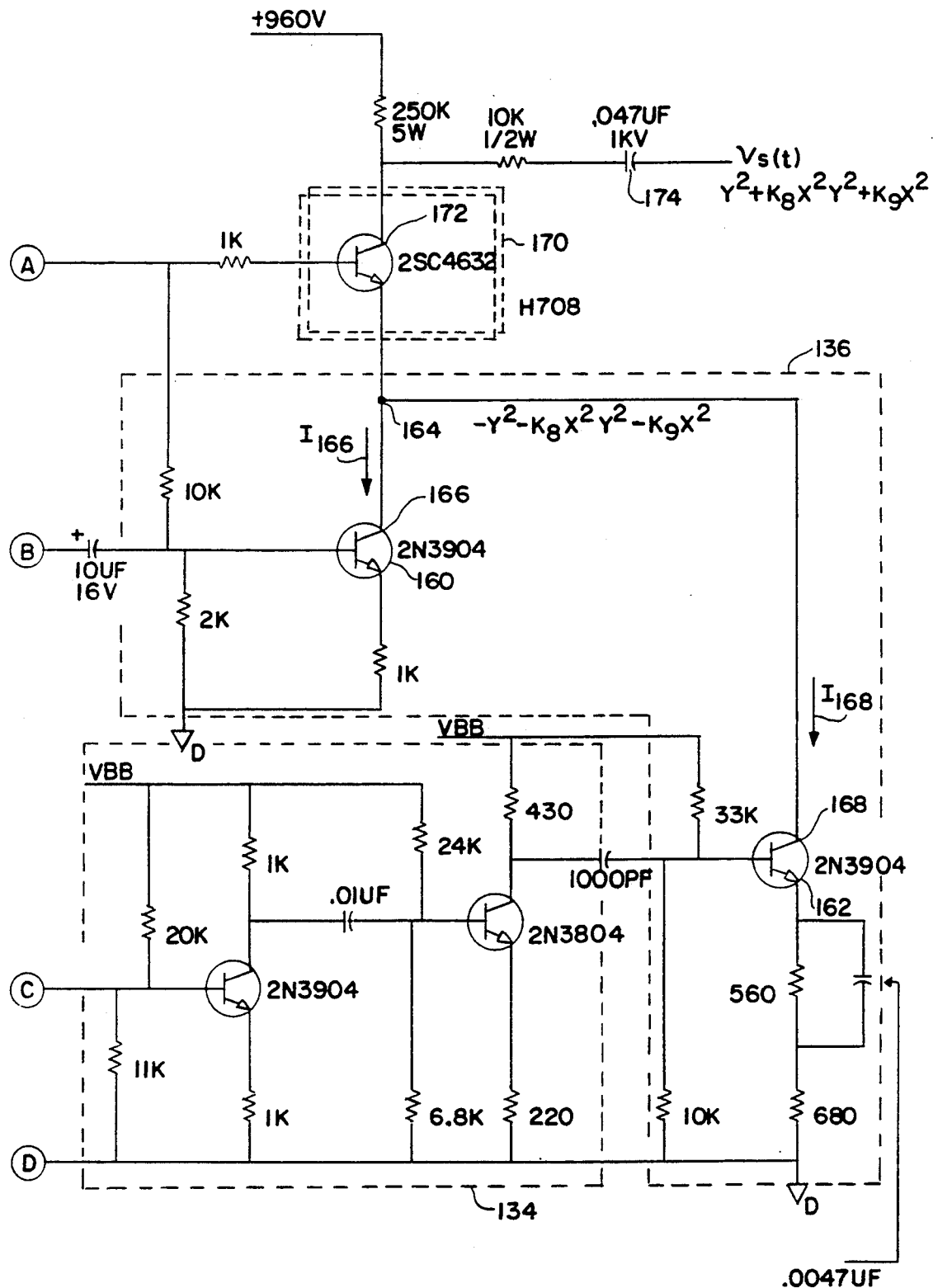

Referring now to FIG. 7, there is shown a discrete circuit embodiment of the dynamic focus signal generator 47. Here the dynamic focus signal generator 47 includes a difference circuit 130, a FET 132, a gain stage 134, and an adder 136.

The difference circuit 130 is implemented discretely with transistors 138 and 140 and network 142. The signals Vs1 (proportional to $(Y-Y^2)$) and Vs2 (proportional to Y) are fed to the network 142, which feeds the base 144 of the transistor 138. The transistor 138 provides at its collector 146 a signal proportional to $Y^2$. The collector 146 of the transistor 138 is coupled to the base 148 of the transistor 140, which serves to invert and provide gain to the signal $Y^2$, providing the signal $-K_8Y^2$ at its collector 150. A biasing resistor 151 adds DC offset to the signal $-K_8Y^2$. The signal $-(K_8Y^2+K_9)$ is coupled to the gate 152 of the FET 132.

The drain 156 of the FET 132 is fed by the signal $-X^2$ from the deflection circuitry, and the source 158 is coupled to ground. In this configuration for the signal levels used, the FET 132 remains in its ohmic region and thus acts as a voltage variable resistor; that is, the voltage signal at the drain 156 is directly proportional to the negative of the gate voltage signal $-(K_8Y^2+K_9)$. Further driving the drain 156 with the signal $-X^2$ results in a signal at the drain 156 proportional to $-X^2(K_8Y^2+K_9)$. The signal $-X^2(K_8Y^2+K_9)$ is fed to the gain stage 134, the output of which is fed to the adder 136.

The adder 136 is equivalent to the adder 98 of FIG. 6. The adder 136 includes two transistors 160 and 162 whose collectors are connected at node 164. The collector 166 of the transistor 160 provides a current proportional to the signal $-Y^2$, while the collector 168 of the transistor 162 provides a current proportional to the signal $-X^2(K_8Y^2+K_9)$. The current at node 164 is proportional to the sum of the collector 166 and 168 currents, thus providing a current proportional to $-Y^2-K_8X^2Y^2-K_9X^2$. This current is further coupled to a high power transistor 170 which provides at its collector 172 a voltage signal $V_f(t)$ proportional to $Y^2+K_8X^2Y^2+K_9X^2$, which is of the form of Equations 1 and 3, and amplified & DC shifted to the level required by the focus grid 44 (FIG. 2).

There are of course may possible positive symmetric functions f(Y) which can be used to approximate the profile shown generally in FIG. 3(a). In operation, the magnitude of the dynamic focus signal $V_f(t)$ is on the order of hundreds of volts, with a margin on the order of tens of volts within which focus is maintained. A variety of useful functions f(Y) can produce a signal $V_f(t)$ which has increased magnitude at the corners of the screen within this margin.

Figure 8A:
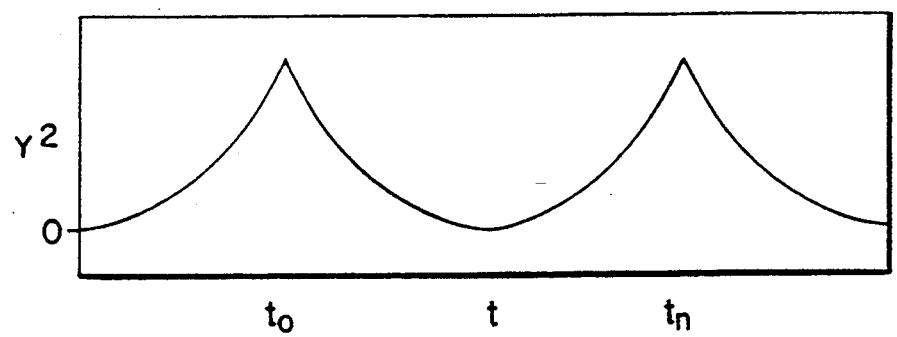
FIG. 8(a) is a plot of vertical deflection squared ($Y^2$) as a function of time.
Figure 8B:
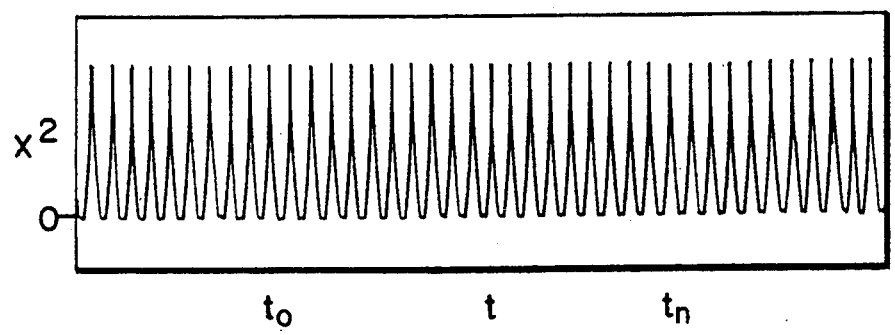
FIG. 8(b) is a plot of horizontal deflection squared ($X^2$) as a function of time.
Figure 8C:
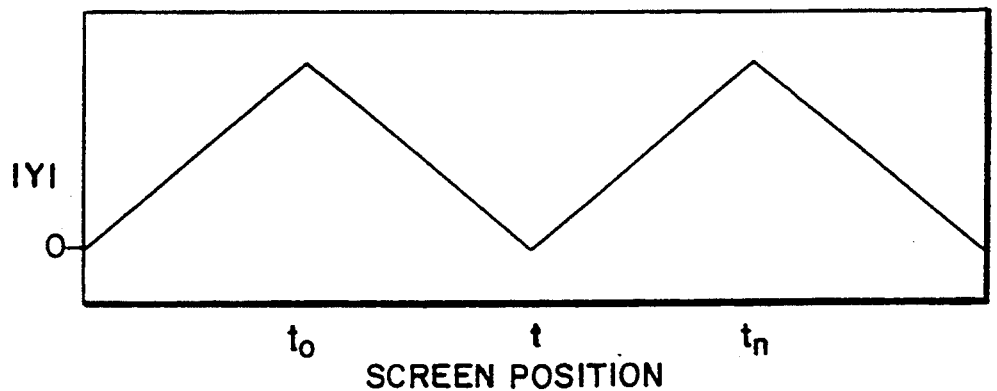
FIG. 8(c) is a plot of the absolute value of vertical deflection |Y| as a function of time.
Figure 8D:
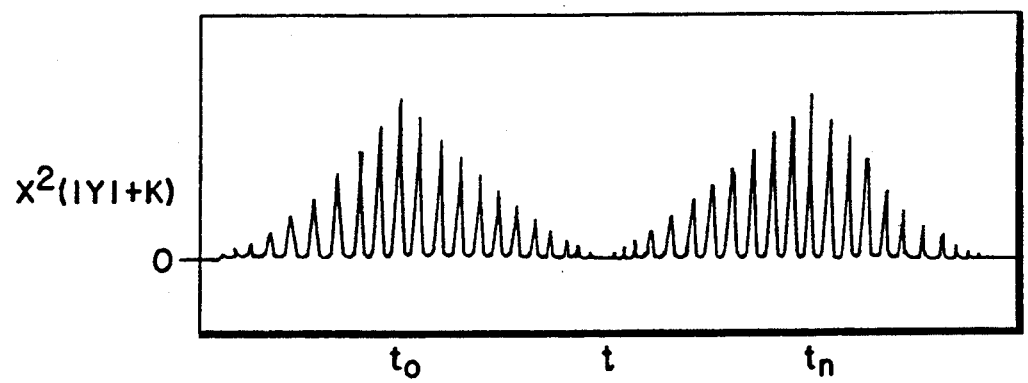
FIG. 8(d) is a plot of a signal proportional to $X^2(|Y|+K)$ as a function of time.
Figure 8E:
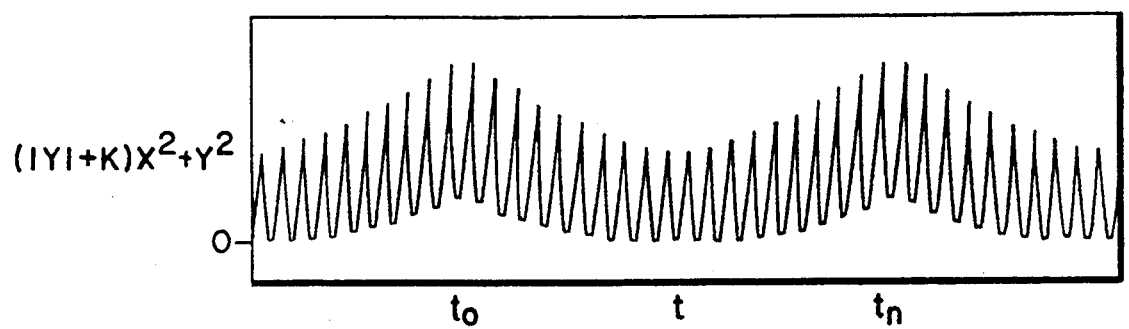
FIG. 8(e) is a plot of a signal proportional to $X^2(|Y|+K) + Y^2$ as a function of time.

For example, referring now to FIG. 8, there are shown graphs representing the generation of another focus signal $V_f(t)$ of the form of Equation 1 for a 20 line raster scan system, and particularly of the form:

$$X^2+Y^2+X^2|Y|$$

where $f(Y)=|Y|$. The parabolic functions $Y^2$ and $X^2$ shown in FIGS. 8(a) and 8(b) respectively are the same as those shown in FIG. 3. In FIG. 8(c) there is shown the positive symmetric function $|Y|+K_{10}$ which is the absolute value of the ramp deflection voltage Y plus some DC offset. The peaks of the function $|Y|+K_{10}$ occur when the beam is positioned at the top and bottom of the screen. In FIG. 8(d) there is shown the multiplication of the functions of FIGS. 8(b) and 8(d) to obtain the function $X^2(|Y|+K_{10})$. In FIG. 8(c) there is shown the sum of the functions of FIGS. 8(d) and 8(a), providing the function $X^2(|Y|+K_{10})+Y^2$, which is of the form of Equation 4. It is apparent that the use of the positive symmetric function representing the absolute value of the vertical deflection signal also provides a dynamic focus voltage signal $V_f(t)$ with increased magnitude at the corners of the screen.

It is also apparent that the dynamic focus signal generator 47 may accept information related to the position of the beam 12 on the CRT screen 14 in any number of possible forms from the deflection circuitry 45 or even from the video controller 46, with the circuitry for providing the output dynamic focus signal $V_f(t)$ varying accordingly. For example, the dynamic focus signal generator 47 may accept as input the vertical and horizontal deflection signals X and Y, the circuitry thus including means for squaring the deflection signals X and Y as well as the necessary multiplication and summation means. Alternatively, a VLSI chip could be provided to accept as input a synchronization signal from the video controller 46. Intermediate circuitry would then provide the horizontal and vertical deflection signals and their squares therefrom to provide the dynamic focus signal $V_f(t)$.

It is apparent that, within the scope of the invention, modifications and different arrangements may be made other than as herein disclosed. The present disclosure is merely illustrative, the invention comprehending all variations thereof.

What is claimed is:

1. A dynamic focus signal generator for a CRT having a deflection signal including a horizontal and a vertical component, the dynamic focusing signal generator comprising:

means for providing a signal proportional to the square of the horizontal component of the deflection signal as a squared horizontal position signal $X^2$;

means for providing a signal proportional to the square of the vertical component of the deflection signal as a squared vertical position signal $Y^2$;

means for providing a positive symmetrical function f(Y) of the vertical component of the deflection signal;

means for providing a signal proportional to the product of the positive symmetrical function f(Y) and the squared horizontal position signal $X^2$;

means for providing a signal proportional to the sum of the product, the squared horizontal position signal $X^2$, and the squared vertical position signal $Y^2$.

2. A dynamic focus signal generator for a CRT having a deflection signal including a horizontal and a vertical component, the dynamic focus signal generator comprising:

means for providing a signal proportional to the square of the horizontal component of the deflection signal as a squared horizontal position signal $X^2$;

means for providing a signal proportional to the square of the vertical component of the deflection signal as a squared vertical position signal $Y^2$;

means for providing a signal proportional to the product of the squared vertical position signal $Y^2$ and the squared horizontal position signal $X^2$;

means for providing a signal proportional to the sum of the signal proportional to the product, the squared horizontal position signal $X^2$, and the squared vertical position signal $Y^2$.

3. A dynamic focus signal generator for a CRT having a deflection signal including a horizontal and a vertical component, the dynamic focusing signal generator comprising:

means for providing a signal proportional to the square of the horizontal component of the deflection signal as a squared horizontal position signal $X^2$;

means for providing a signal proportional to the square of the vertical component of the deflection signal as a squared vertical position signal $Y^2$;

means for providing a positive symmetrical function $f(X)$ of the horizontal component of the deflection signal;

means for providing a signal proportional to the product of the positive symmetrical function $f(X)$ and the squared vertical position signal $Y^2$;

means for providing a signal proportional to the sum of the product, the squared horizontal position signal $X^2$, and the squared vertical position signal $Y^2$.

4. A method of generating a dynamic focus signal for focusing an electron beam on a CRT screen, the CRT having a deflection signal including a horizontal and a vertical component, the method comprising the steps of:

providing a signal proportional to the square of the horizontal component of the deflection signal as a squared horizontal position signal $X^2$;

providing a signal proportional to the square of the vertical component of the deflection signal as a squared vertical position signal $Y^2$;

providing a positive symmetrical function $f(Y)$ of the vertical component of the deflection signal;

providing a signal proportional to the product of the positive symmetrical function $f(Y)$ and the squared horizontal position signal $X^2$;

providing a signal proportional to the sum of the product, the squared horizontal position signal $X^2$, and the squared vertical position signal $Y^2$.

5. A method of generating a dynamic focus signal for focusing an electron beam on a CRT screen, the CRT having a deflection signal including a horizontal and a vertical component, the method comprising the steps of:

providing a signal proportional to the square of the horizontal component of the deflection signal as a squared horizontal position signal $X^2$;

providing a signal proportional to the square of the vertical component of the deflection signal as a squared vertical position signal $Y^2$;

providing a signal proportional to the product of the squared vertical position signal $Y^2$ and the squared horizontal position signal $X^2$;

providing a signal proportional to the sum of the signal proportional to the product, the squared horizontal position signal $X^2$, and the squared vertical position signal $Y^2$.

6. A method of generating a dynamic focus signal for focusing an electron beam on a CRT screen, the CRT having a deflection signal including a horizontal and a vertical component, the method comprising the steps of:

providing a signal proportional to the square of the horizontal component of the deflection signal as a squared horizontal position signal $X^2$;

providing a signal proportional to the square of the vertical component of the deflection signal as a squared vertical position signal $Y^2$;

providing a positive symmetrical function $f(X)$ of the horizontal component of the deflection signal;

providing a signal proportional to the product of the positive symmetrical function $f(X)$ and the squared vertical position signal $Y^2$;

providing a signal proportional to the sum of the product, the squared horizontal position signal $X^2$, and the squared vertical position signal $Y^2$.

* * * * *